(12) United States Patent
Tran

(10) Patent No.: US 11,732,405 B2
(45) Date of Patent: Aug. 22, 2023

(54) FAUX-LEATHER BIOMATERIAL

(71) Applicant: TomTex, Inc., Brooklyn, NY (US)

(72) Inventor: Uyen Thi Thao Tran, New York, NY (US)

(73) Assignee: TOMTEX, INC., Brooklyn, NY (US)

( * ) Notice: Subject to any disclaimer, the term of this patent is extended or adjusted under 35 U.S.C. 154(b) by 0 days.

(21) Appl. No.: 18/107,780

(22) Filed: Feb. 9, 2023

(65) Prior Publication Data

US 2023/0193556 A1 Jun. 22, 2023

Related U.S. Application Data

(63) Continuation of application No. PCT/US2021/048225, filed on Aug. 30, 2021.

(51) Int. Cl.
*D06N 3/12* (2006.01)
*D06N 3/00* (2006.01)

(52) U.S. Cl.
CPC ........... *D06N 3/126* (2013.01); *D06N 3/007* (2013.01); *D06N 3/0059* (2013.01); *D06N 3/0061* (2013.01); *D06N 2209/128* (2013.01); *D06N 2211/28* (2013.01); *D10B 2211/04* (2013.01)

(58) Field of Classification Search
CPC .... D06N 3/126; D06N 3/0059; D06N 3/0061; D06N 3/007; D06N 2209/128; D06N 2211/28; D10B 2211/04
USPC .......................................................... 524/27
See application file for complete search history.

(56) References Cited

U.S. PATENT DOCUMENTS

2016/0296665 A1* 10/2016 Ingber .................... B05D 3/104
2019/0367732 A1 12/2019 Helgason et al.

FOREIGN PATENT DOCUMENTS

| WO | 2018026853 A1 | 2/2018 |
| WO | 2019067737 A1 | 4/2019 |
| WO | 2019067745 A1 | 4/2019 |
| WO | 2019094700 A1 | 5/2019 |
| WO | 2021016139 A1 | 1/2021 |

OTHER PUBLICATIONS

International search report and written opinion issued by the International Searching Authority for International Patent Application No. PCT/US21/48225, dated Dec. 6, 2021.

* cited by examiner

*Primary Examiner* — Hui H Chin
(74) *Attorney, Agent, or Firm* — Myers Wolin, LLC

(57) ABSTRACT

A faux leather biomaterial is disclosed. It may be made from shell seafood waste and coffee grounds with the aim to work as a sustainable alternative instead of prior art faux and animal leathers.

1 Claim, No Drawings

FAUX-LEATHER BIOMATERIAL

CROSS REFERENCE TO RELATED APPLICATIONS

This application is a continuation of International Patent Application No. PCT/US2021/048225, filed Aug. 30, 2021, which claims priority from U.S. provisional application 63/073,570, filed Sep. 2, 2020, which is incorporated herein in its entirety.

BACKGROUND OF THE INVENTION

Leather, i.e., material derived from animal hides, is used in many applications across different industries. However, these industries cause pollution and other harms. Faux leather, which is made from a plastic base, suffers from many of the same disadvantages as leather, and is typically not biodegradable.

A leather substitute which minimizes such problems is desirable. Many companies are now using "sustainability" to advertise their leather and faux leather products. But most such biodegradable materials are actually "industrial biodegradable," by which is meant they biodegrade only in controlled conditions of temperature and humidity in industrial environment. Therefore, they are in many ways as bad as regular plastics.

Every year, over 9 million tons of wasted coffee grounds end up in landfills generating 14 tons of $CO_2$, while the food industry generates 6 million to 8 million tons of crab, shrimp, and lobster shell waste. These wastes, when repurposed properly, can be a viable source of chitin, a polysaccharide that exhibits exceptional inherent characteristics including biodegradability, antimicrobial, and antioxidant activities. In addition, the production of textile materials, such as vegan leather and traditionally-produced animal leather, is a major cause of environmental destruction and greenhouse gas emissions due to its usage of toxic materials like polyurethane. These wastes, when properly processed and repurposed, can be a viable source of raw material with great characteristics for the circular economy.

SUMMARY OF THE INVENTION

The faux leather material of the invention is unique in its excellent softness to the touch while delivering high performance and durability. It may be made using 100% natural dye ingredients with a variety of colors from ochre, coffee, and charcoal. An optional coating of beeswax layer enhances its water-resistance properties. Additionally, it can be hand-stitched or machine-sewed. Therefore, it can be used as a normal textile material. The faux leather material of the invention can replicate any textured surface including animal skin/exotic skin textures, and other design patterns. Besides, this highly versatile process is tunable to many types of base materials, including the production of plastic-like, rubber, and silicone-like material. It is very desirable in the circular fashion economy, as all of the component materials can be disassembled and reused using the same process.

The faux leather material of the invention will provide an alternative for the toxic tanning process, which permanently alters the protein structure of the skin, making it more durable and less susceptible to decomposition, in leather production. More than 90% of the leather produced globally is chrome tanned causing negative impacts on the environment and workers' health safety. According to a study conducted by France Labrèche, exposed tannery workers tend to have a higher cancer risk "between 20% and 50% above expected". The technology of the present invention makes use of natural dye ingredients and takes out the leather tanning process.

A faux leather biomaterial has now been is created. It is made from shell seafood waste and coffee grounds with the aim to work as a sustainable alternative instead of other faux and animal leathers. This biomaterial has the advantages of (1) being 100% composable, (2) being scalable to larger form, and (3) being usable for more personal items. The faux leather biomaterial of the invention not only solves the pollution problems exhibited by leather and other faux leathers but also pushes seafood and coffee production into a better ecosystem platform. Seafood and coffee ground wastes are widely available but most of them end up in landfills where every ton of these wastes generates 14 tons of $CO_2$.

The faux leather biomaterial of the invention provides designers with creative freedom with less material constraints on size and scaling while minimizing any negative environmental impact. Furthermore, the recycled faux leather biomaterial exhibits high performance and quality, so it maximizes the product's life cycle while minimizing any negative impact on the environment.

Vegan leather, which is often made from toxic polyurethane, and traditionally produced animal-derived leather, is hugely responsible for environmental destruction and greenhouse gas emissions.

DETAILED DESCRIPTION OF THE INVENTION

The faux leather biomaterial of the invention minimizes negative impacts on the environment with the following key characteristics:

The transparent process minimizes the usage of toxic chemicals,
100% compostability,
Recyclability and versatility,
No tanning process involved in the production,
Sustainability without fabric backing.

The faux leather biomaterial of the invention employs novel technology utilizing naturally derived chitin-sourced-material to create a leather alternative material. The resulting composite bio-based material performs better in durability, flexibility, dimensional stability, and fabrication integrity, compared to traditional alternative synthetic leathers and exhibits properties closer to natural leather. The current process involves several sequential chemistry steps to create a strong cross-linking polymer matrix with the ability to customize the desired decorative or structural textures.

The faux leather biomaterial of the invention provides designers with creative freedom with less material constraints on size and scaling. Because the faux leather biomaterial of the invention can simulate any texture surface, there are endless possibilities for pattern design. Besides that, it can be customized to be like any rubber/silicone-like or plastic-like leather material by adjusting the formula and the way of production. Therefore, the faux leather biomaterial of the invention can be applied in leather goods or packaging across the industries from fashion, interior, to industrial design.

Some of the key advantages of the faux leather biomaterial of the invention are: (1) the transparent process, which minimizes the usage of toxic chemicals, (2) the ability to be recycled, (3) 100% compostability, and (4) usability as a natural fertilizer for plants. By comparing its longer life cycle with the current industry standard, the faux leather biomaterial of the invention requires 100 times less production carbon footprint than animal leather and uses 60 times less water than prior art faux leather.

The faux leather biomaterial of the invention comprises on a wt/wt basis: (1) chitosan: 38-42%, (2) silk peptide: 2-4%, (3) lactic acid: 40-45%, and (4) add-on color: 5%-8%.

It is prepared by a process which comprises: (1) mixing all the ingredients including colors options except the lactic acid into a blender; (2) adding warm water or room temperature water (68 to 212 degrees Fahrenheit) to the mixture; (3) blending the mixture and water together at low speed; (4) removing all the bubbles on the surface of the mixture from step (3); (5) adding lactic acid; (6) blending the product of step (5) at low speed; (7) over a sieve to reduce bubbles, pouring the product of step 6, into a metal, aluminum, silicone, plastic, or clay mold; (8) air-drying the product of step 7 for 2-4 days and then peeling it off when dry; and (9) optionally coating the product of step 8 with a layer of bees wax or shellac (such as from a lac bug) to enhance water resistance.

The invention is further defined by reference to the following example, which is intended to be illustrative and not limiting.

For a 16 inches*12 Inches (406400 μm*304800 μm) sample material (This formula is the standard for scaling the material):

Chitosan (90+% Deacetylated, or lower): 78 grams (flexible, and may be less or more depending on the density of the end result);
Silk peptide (Silk Fibroin): 4-8 grams;
Glycerine: 1.23 mL (flexible depending on the softness);
Lactic acid (80%-88%): 89 ml (flexible, and may be less or more depending on the density of chitosan)
Add on color:
ground coffee waste color;
ochre, charcoal natural color;
Substitute for lactic acid is citric acid The design mold for the example may be made of metal, aluminum, silicone, plastic, clay.

Step 1: Mix all the ingredients including colors but except lactic acid into a blender;
Step 2: Use warm water or room temperature water (68 to 212 degrees Fahrenheit) to the mixture
Step 3: Blend together at low speed;
Step 4: Remove all the bubbles on the surface of the mixture;
Step 5: Add lactic acid;
Step 6: Blend again with low speed;
Step 7: Pour the mixture over the sieve to reduce bubbles, into a mold;
Step 8: Air-dry for 2-4 days and peel off when the material dry;
Step 9: The material can be coated with a layer of bees wax or shellac (lac bug) to enhance the water resistance property.

What is claimed is:

1. A process for producing a faux leather biomaterial comprising on a wt/wt basis: 1) chitosan: 38-42%, 2) silk peptide: 2-4%, 3) lactic acid: 40-45%, and 4) add-on color: 5%-8%, the method comprising:
   1) Mixing all the ingredients including colors options except the lactic acid into a blender;
   2) adding warm water (68 to 212 degrees Fahrenheit) to the mixture;
   3) blending the mixture and water together;
   4) removing all the bubbles on the surface of the mixture from step 3;
   5) adding lactic acid;
   6) blending the product of step 5;
   7) over a sieve to reduce bubbles, pouring the product of step 6, into a metal, aluminum, silicone, plastic, or clay mold;
   8) air-drying the product of step 7 for 2-4 days and then peeling it off when dry; and
   9) optionally coating the product of step 8 with a layer of bees wax or shellac to enhance water resistance.

* * * * *